US008805880B2

(12) United States Patent
Van Hensbergen (10) Patent No.: US 8,805,880 B2
(45) Date of Patent: Aug. 12, 2014

(54) ESTABLISHMENT, OPTIMIZATION, AND ROUTING OF REMOTE TRANSITIVE NAME SPACE ACCESS

(75) Inventor: Eric Van Hensbergen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 13/563,890

(22) Filed: Aug. 1, 2012

(65) Prior Publication Data

US 2014/0040330 A1    Feb. 6, 2014

(51) Int. Cl.
    *G06F 7/00*     (2006.01)
    *G06F 17/30*     (2006.01)
    *G06F 12/00*     (2006.01)

(52) U.S. Cl.
    USPC ............................ 707/782; 707/827; 707/831

(58) Field of Classification Search
    CPC ................................................ G06F 17/30197
    USPC .......................................... 707/782, 831, 827
    See application file for complete search history.

(56) References Cited

U.S. PATENT DOCUMENTS

| | | | |
|---|---|---|---|
| 5,724,512 A | | 3/1998 | Winterbottom |
| 7,185,359 B2 | | 2/2007 | Schmidt et al. |
| 7,613,703 B2 | | 11/2009 | Kakivaya et al. |
| 8,095,525 B2 | | 1/2012 | Le et al. |
| 2003/0009449 A1 | * | 1/2003 | Grubbs et al. ................. 707/3 |
| 2003/0120948 A1 | | 6/2003 | Schmidt et al. |
| 2005/0149528 A1 | * | 7/2005 | Anderson et al. ................. 707/9 |
| 2005/0251500 A1 | * | 11/2005 | Vahalia et al. .................... 707/1 |
| 2009/0106255 A1 | * | 4/2009 | Lacapra et al. ................. 707/10 |

OTHER PUBLICATIONS

Ionkov et al. "XCPU2 distributed seamless desktop extension", 2009, IEEE International Conference on Cluster Computing and Workshops, Cluster '09.*
Harris, JF et al., "Method for Forward Transitive Fully Connected Collection Management", www.ip.com, No. IPCOM000036969D, Jan. 29, 2005, 7 pages.
Lentini, J. et al., "Requirements for Federated File Systems (RFC5716)", www.ip.com, No. IPCOM000193132D, Feb. 11, 2010, 53 pages.
Rogado, Jose , "A Prototype File System for the Cluster OS", OSF Research Institute, Gieres, France, http://netlab.ulusofona.pt/cd/teoricas/Prototype_Cluster_FS.pdf, May 1993, 13 pages.

* cited by examiner

*Primary Examiner* — James E Richardson
(74) *Attorney, Agent, or Firm* — Stephen R. Tkacs; Stephen J. Walder, Jr.; John O. Flynn (57) ABSTRACT

A mechanism is provided for establishment, optimization, and routing of remote transitive name space access. The illustrative mechanism adds a new protocol primitive to distributed file systems, which establishes a new multiplexed client connection between the client, the transitive server, and the destination server(s). The protocol allows establishment of remote mounts on a transitive file server. The protocol allows the client to request a "recipe" for a direct connection to the destination file server without intermediate nodes. The protocol allows the intermediate server to be established as a multiplexer that forwards requests/responses to/from destination servers without unmarshalling/remarshalling.

20 Claims, 4 Drawing Sheets

```
RDMA!123.12.12.3!5066 -- infiniband RDMA
TCP!10.1.0.1!5078 -- TCP via Torus network
TCP!11.1.0.1!5078 -- TCP via Collective network
TCP!172.17.168.12!5078 -- TCP via ethernet
```

ESTABLISHMENT, OPTIMIZATION, AND ROUTING OF REMOTE TRANSITIVE NAME SPACE ACCESS

BACKGROUND

The present application relates generally to an improved data processing apparatus and method and more specifically to mechanisms for establishment, optimization, and routing of remote transitive name space access.

A distributed file system, or network file system, is any file system that allows access to files from multiple hosts sharing via a computer network. This makes it possible for multiple users on multiple machines to share files and storage resources. The client nodes do not have direct access to the underlying block storage but interact over the network using a protocol. This makes it possible to restrict access to the file system depending on access lists or capabilities on both the servers and the clients, depending on how the protocol is designed.

Transparency is usually built into distributed file systems, so that files accessed over the network can be treated the same as files on local disk by programs and users. The multiplicity and dispersion of servers and storage devices are thus made invisible. It is up to the network file system to locate the files and to arrange for the transport of the data.

SUMMARY

In one illustrative embodiment, a method, in a server data processing system, is provided for remote transitive name space access. The method comprises responsive to receiving a protocol packet for accessing a destination file server, determining whether the destination file server is for a local file system or a remote file system. The method further comprises responsive to determining the destination file server is for a local file system, processing the protocol packet at the server data processing system. The method further comprises responsive to determining the destination file server is for a remote file system, forwarding the protocol packet to the destination file server.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for establishment, optimization, and routing of remote transitive name space access. The illustrative embodiments add a new protocol primitive to distributed file systems, which establishes a new multiplexed client connection between the client, the transitive server, and the destination server(s). The protocol allows establishment of remote mounts on a transitive file server. The protocol allows the client to request a "recipe" for a direct connection to the destination file server without intermediate nodes. The protocol allows the intermediate server to be established as a multiplexer that forwards requests/responses to/from destination servers without unmarshalling/remarshalling the actual requests and eliminating the usual overheads of such transactions.

Figure 1:
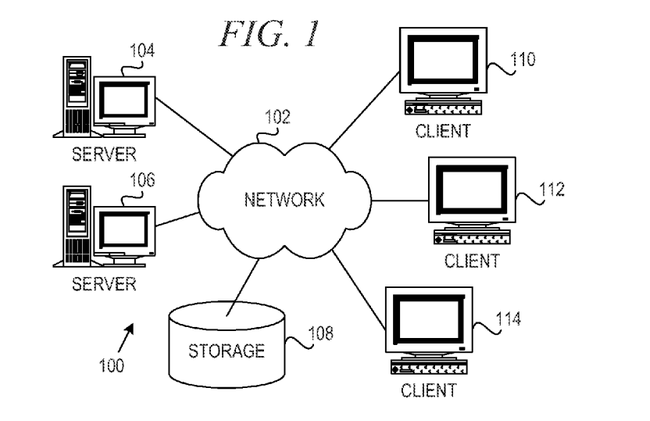
FIG. 1 depicts a pictorial representation of an example distributed data processing system in which aspects of the illustrative embodiments may be implemented.
Figure 2:
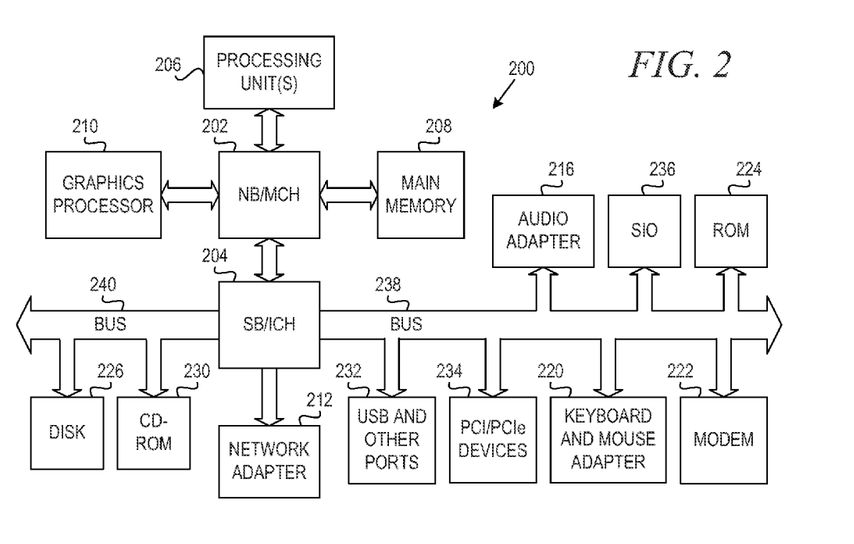
FIG. 2 is a block diagram of an example data processing system in which aspects of the illustrative embodiments may be implemented.
Figure 3:
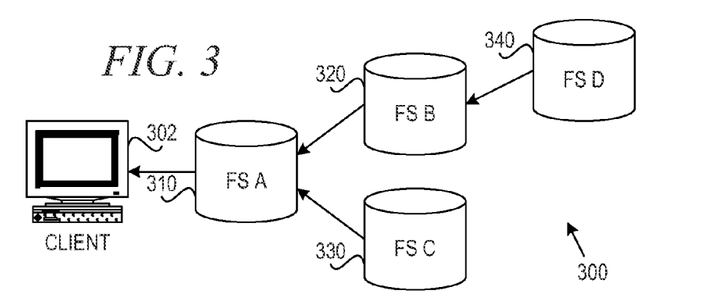
FIG. 3 is a block diagram illustrating a distributed file system in which aspects of the illustrative embodiments may be implemented.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 12 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates.).

As a server, data processing system 200 may be, for example, an IBM® eServer™ System p® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 is a block diagram illustrating a distributed file system in which aspects of the illustrative embodiments may be implemented. In an example embodiment, distributed file system 300 comprises file system (FS) A 310, FS B 320, FS C 330, and FS D 340. Each FS comprises a FS server and FS data. Client 302 accesses distributed file system 300 through FS A 310, which comprises a transitive server through which client 302 accesses FS B 320, FS C 330, and FS D 340. FS B 320 comprises a transitive server through which client 302 accesses FS D 340. It is important to note that that the four file servers mentioned above could be on different network segments such that FS D 340 is not directly reachable or even addressable from FS A 310.

In distributed file systems, sometimes file servers are mounted via a transitive server, which acts as a relay and name space composition point. When dealing with resource sharing and multiple servers in a distributed name space, transitively mounted services are problematic. Certain protocols disallow transitive mounts due to breakage of protocol design assumptions. Protocols that support transitive mounts do so in one of two inefficient ways: 1) encapsulation; and, 2) unmarshalling, processing through the kernel, and remarshalling at every transitive point.

Distributed file system protocols cannot manipulate the transitive mounts on the server. Mounts must be set up on the server either prior to export or in the global name space by an entity on the server, or, alternatively, an open-ended automounter configuration must be in place. Third party protocols are available on some systems to set up these sorts of mounts; however, they are not tightly integrated with the protocol itself requiring a separate entity to manage the transitive mounts.

In accordance with an illustrative embodiment, a new protocol primitive is added to the distributed file system 300 that establishes a new multiplexed client connection between client 302, transitive server FS A 310, and the destination server, such as FS B 320.

Figure 4:
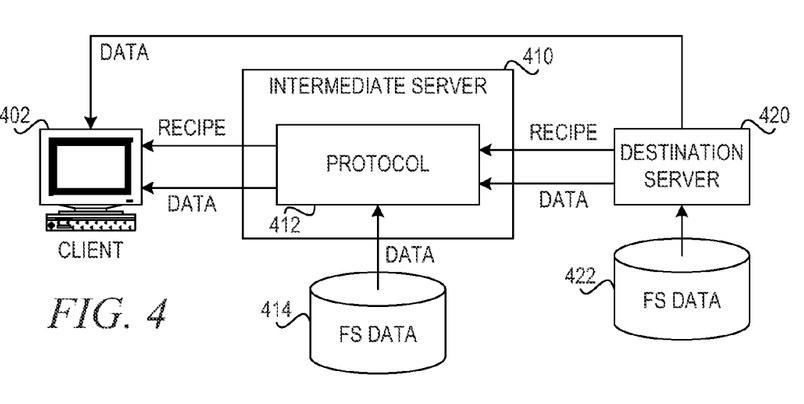
FIG. 4 is a block diagram illustrating a distributed file system with remote transitive name space access in accordance with an illustrative embodiment.

FIG. 4 is a block diagram illustrating a distributed file system with remote transitive name space access in accordance with an illustrative embodiment. Client 402 accesses the distributed file system via intermediate server 410. Client 402 accesses FS data 414 through intermediate server 410. Client 402 may also access FS data 422 through destination server 420.

Protocol 412 allows client 402 to establish a remote mount on intermediate server 410. A specified directory in protocol 412 becomes mount point on server 410 either for all clients or just for client 402, based on flags. The protocol 412 unmounts by clunk/close of mount-point by client. Protocol 412 enables transitive mounts. Protocol 412 can be used to establish a transitive mount for all clients. Establishment of remote mounts does not require client tracking and eliminates encapsulation overheads. Establishment of remote mounts does not eliminate marshall/unmarshall.

Figure 5:
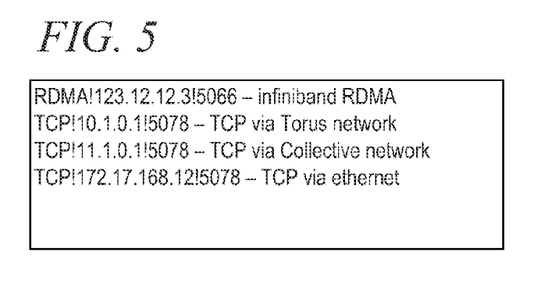
FIG. 5 depicts a connection recipe for remote mount in accordance with an illustrative embodiment.

Protocol 412 allows client 402 to request a "recipe" for a direct connection to the destination file server 420 without the intermediate server 410. Client 402 essentially asks for how the server connects to destination file server 420. A request for a recipe can actually be answered by destination file server 420 with multiple recipes in order of preference. FIG. 5 depicts a connection recipe for remote mount in accordance with an illustrative embodiment. Client 402 establishes connection with its own local mount point, no further transient server involvement.

Protocol 412 allows intermediate server 410 to be established as a multiplexer, which forwards requests/responses to/from destination server 420 without unmarshalling/remarshalling. Protocol 412 establishes a new session identifier (ID), which may be encapsulated into a pre-existing statefull transaction ID. Intermediate file server 410 tracks sessions associated with the transitive session and directly routes protocol packets to the target server or next transitive hop 420. Client 402 must track mount points to associate them with sub-root IDs for transitive mounts.

9P is a distributed resource sharing protocol developed as part of the Plan 9 research operating system at Bell Laboratories (now a part of Alcatel Lucent Technologies) by the Computer Science Research Center. It can be used to distributed file systems, devices, and application services. It was designed as an interface to both local and remote resources, making the transition from local to cluster to grid resources transparent.

9P2000.TM is a proprietary extension to the 9P protocol and can also be used in combination with other extensions, such as 9P2000.L. As a proprietary extension, the operations it specifies should be considered optional and both clients and servers should degrade gracefully if they not implement necessary extension components.

Using Tags to Identify Transitive Mount Operations

The 9P protocol variants all have a common 7-byte header, which is parsed on the server in order to load the rest of the request and direct the request to the right processing functions. The tag[2] element, which is part of this common 7-byte header, is a 16-bit client chosen identifier which is used to match asynchronous requests occurring on the same session between the client and the server. Clients simply match response tags with original request tags to identify which responses from the server go to which requests.

For transitive mounts we take advantage of the client-directed nature of the tagging mechanism and overload its function to also inform the server to direct the request to a different server which the intermediate server has transitively mounted. There are three potential implementations for such a mechanism described below.

In the illustrative embodiment, the client simply uses the top bit of the tag[2] protocol element to mark the operation as being destined for a remote server and not the transitive server. This triggers the server to load the remainder of the request if necessary and peek at the next 4 bytes of the protocol which identify the fid[4] for the request. FIDs are file handles used to address requests to a particular file system element. Transitive FIDs on servers are used to track the next-hop-server or destination-server as part of their server maintained state. The server mux uses this information to forward the packet without further processing to the next-hop-server or destination server.

There are complications that also must be handled by the server, namely protocol operations that do not include a fid[4] as one of the first argument after the protocol header. Two of these are only sent during session initialization (Tversion, Tauth) and would never be sent over a transitive mount. The third, Tflush is a protocol operation used to cancel an outstanding request. In order to propagate Tflush requests to a transitive mount, intermediate servers must also track the tag[2] associated with outstanding transitive requests and automatically detect and forward Tflush requests to the destination server.

rattach,—messages to establish a transitive mount

Synopsis size[4] Trattach tag[2] old-fid[4] new-fid[4] afid 4 flags[1] uname[s] aname[s]

size[4] Rrattach tag[2] qid[13] recipe[s]

Description

The rattach message serves as a mechanism to establish a transitive mount on an intermediate server. The message identifies the user (uname) and specifies the destination server in the aname[s] argument. The afid argument specifies a fid previously established by an auth message, as described in the 9P2000 specification.

As a result of the rattach transaction, the intermediate server will establish its own client connection to the specified remote server and offer resources exported by that server to the client at a mount point specified by the old-fid handle. The client selects a root file handle for the new connection, specified by new-fid. An error is returned if new-fid is already in use. The servers idea of the root of the file tree is represented by the returned qid.

The flags[1] byte can specify a number of potential options for the transitive mount. The OGLOBAL flag is used to instruct the intermediate server to mount the remote server within its own namespace so other clients of the intermediate server can access the remote server over the transitive mount established by the current user. The ONSCLONE flag is the opposite of this, instructing the server to mount the transitive server in private namespace invisible to other clients of the intermediate server. The OADVISE flag is used by the client to instruct the server not to setup the transitive mount, but simply return the list of direct connection recipes to the client. Finally the OMUX flag is used to instruct the server to track tags and fids destined for the remote server and efficiently multiplex protocol requests to the server without intermediate processing on the intermediate node (in other words, the OMUX flag enables the mechanisms of this invention).

The rattach response includes fields similar to that of a 9P2000™ attach message, but also includes a recipe string which the client may attempt to use in order to directly contact the destination server avoiding any overhead of going through an intermediate server. The recipe for direct connection is actually a list of potential ways to contact the destination server (supplied by the destination server itself). Each potential method of contacting the server is included in what is called a dial string, comprised of the network identifier (remote direct memory access (RDMA), TCP, etc.) and the address of the server (for TCP/IP this would include an IP address and a port identifier).

Depending on the implementation, intermediate server 410 must implement transitive mount handling in global as welt as private name space. In accordance with an example embodiment, intermediate server 410 may have an ability to track how it connects to other remote servers to provide a recipe to client 402. In one example embodiment, intermediate server 410 incorporates a multiplexer and client code in order to forward requests directly to destination server 420.

Client 402 comprises a mechanism to request a remote mount. Essentially, there is a limited number of mechanisms for a userspace to communicate with the kernel. One mechanism is system calls, but adding new system calls is frowned upon, particularly in the Linux community. IOCTL is a pre-existing system call that can be used to send commands through existing files other than typical file commands. However, the use of IOCTL is also currently frowned upon in the Linux community. Client 402 must have mount options that include transitive references. Client 402 may also have a synthetic file system interface to the mechanism for requesting a remote mount. Synthetic file systems such as sysfs are the new preferred method of extending the kernel API (as opposed to IOCTLs or new system calls). In accordance with an example embodiment, client 402 tracks mount points in order to manage navigation across transitive mounts. In another example embodiment, client 402 may initiate new mounts.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device. A computer readable storage medium is any computer readable medium that is not a computer readable signal medium.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium is any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 6:
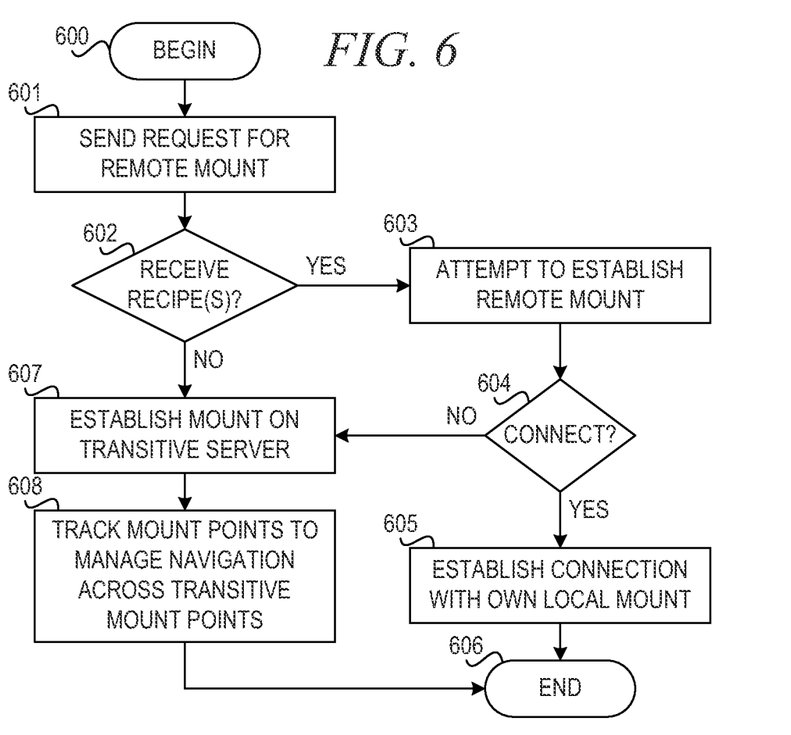
FIG. 6 is a flowchart illustrating operation of a client for establishment of remote transitive name space access in accordance with an illustrative embodiment.

FIG. 6 is a flowchart illustrating operation of a client for establishment of remote transitive name space access in accordance with an illustrative embodiment. Operation begins (block 600), and the client sends a request for remote mount (block 601). The client determines whether a recipe for connecting to the remote file system server is received (block 602). If the client receives a recipe, the client attempts to establish a remote mount (block 603). The client determines whether it is able to connect to the remote file server using the recipe (block 604). If the client is able to connect, the client establishes a connection with its own local mount (block 605). Thereafter, operation ends (block 606).

If the client does not receive a recipe in block 602 or does not connect to the remote server in block 604, the client establishes a mount on the transitive server (block 607). Then, the client tracks mount points to manage navigation across transitive mount points (block 608). Thereafter, operation ends (block 606).

Figure 7:
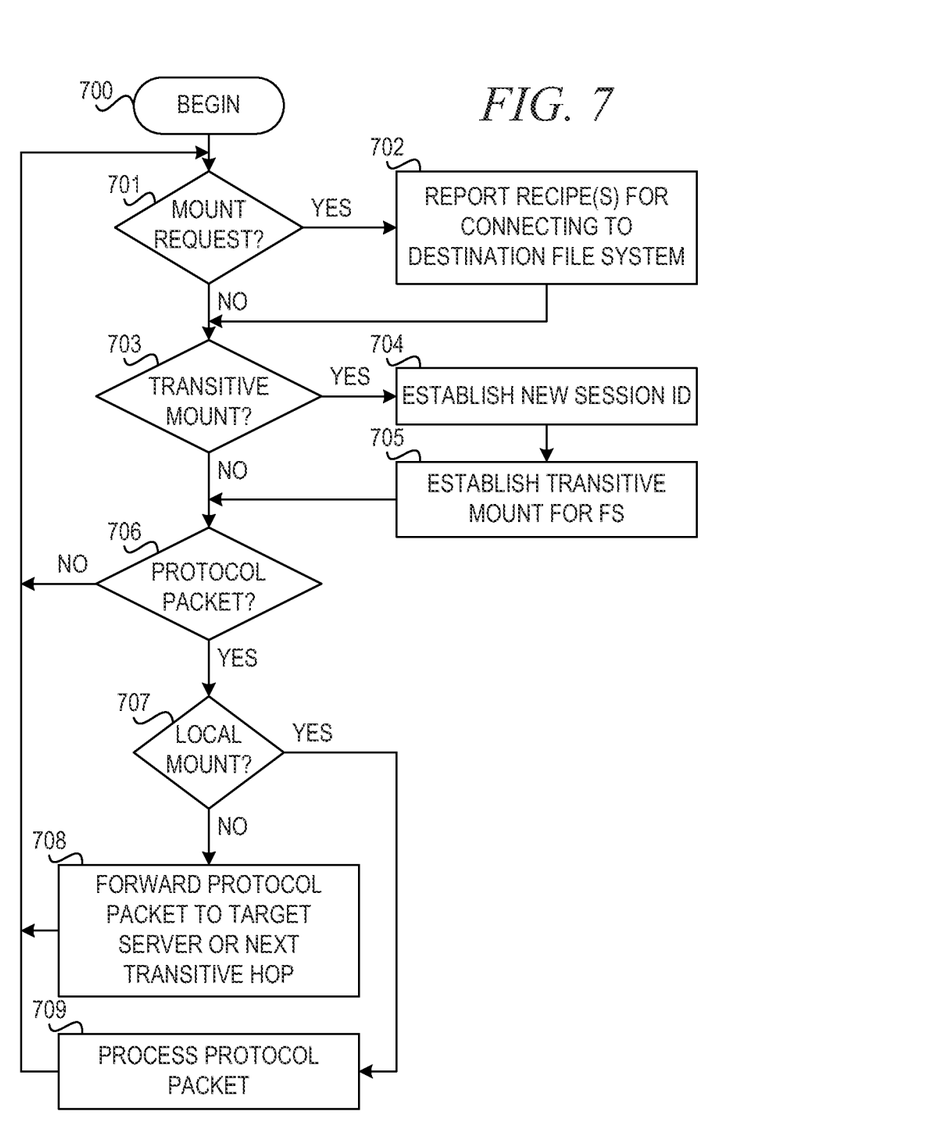
FIG. 7 is a flowchart illustrating operation of a server for establishment and routing of remote transitive name space access in accordance with an illustrative embodiment.

FIG. 7 is a flowchart illustrating operation of a server for establishment and routing of remote transitive name space access in accordance with an illustrative embodiment. Operation begins (block 700), and the server determines whether a mount request for a destination server is received from a client (block 701). If the server receives a mount request, the server reports recipe(s), if any, for connecting to a destination file server (block 702). Thereafter, or if the server does not receive a mount request in block 701, the server determines whether the client requests a transitive mount on the server (block 703).

If the client requests a transitive mount on the server, the server establishes a new session identifier (ID) (block 704). The server then establishes a transitive mount for the destination file server (block 705). Thereafter, or if the client does not request a transitive mount on the server in block 703, the server determines whether a protocol packet is received from a client (block 706). If the server does not receive a protocol packet, operation returns to block 701 to determine whether the server receives a mount request for a destination server.

If the server receives a protocol packet in block 706, the server determines whether the protocol packet is an access request for a local mount (block 707). If the protocol packet is not for a remote mount, the server forwards the protocol packet to the target server or next transitive hop (block 708), and operation returns to block 701 to determine whether the server receives a mount request for a destination server. If the protocol packet is for a local mount in block 707, the server processes the protocol packet (block 709), and operation returns to block 701 to determine whether the server receives a mount request for a destination server.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for establishment, optimization, and routing of remote transitive name space access. The illustrative embodiments add a new protocol primitive to distributed file systems, which establishes a new multiplexed client connection between the client, the transitive server, and the destination server(s). The protocol allows establishment of remote mounts on a transitive file server. The protocol allows the client to request a "recipe" for a direct connection to the destination file server without intermediate nodes. The protocol allows the intermediate server to be established as a multiplexer that forwards requests/responses to/from destination servers without unmarshalling/remarshalling.

The illustrative embodiments provide a path to potential optimizations in configurations, which involve tiered file systems with transitive mounts. The illustrative embodiments provide optimizations for virtual file systems, which transition at the host. The illustrative embodiments provide mechanisms to optimize transitive mounts for IO offload on systems that transitively mount general parallel file system (GPFS) or other file servers via an IO node because of high profile computing (HPC) network segregation. The illustrative embodiments provide optimizations for transitive mounts in firewall or red-zone/blue-zone environments.

As noted above, it should be appreciated that the illustrative embodiments may take the form of an entirety hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a server data processing system, for remote transitive name space access, the method comprising:
   responsive to receiving a protocol packet for accessing a destination file system from a client, determining whether the destination file system is a local file system or a remote file system;
   responsive to determining the destination file system is a local file system, processing the protocol packet at the server data processing system;
   responsive to determining the destination file system is a remote file system, identifying a flag in the protocol packet;
   responsive to the flag comprising a global mount flag, establishing a transitive mount of the remote file system within a global namespace of the server data processing system;
   responsive to the flag comprising a session mount flag, establishing a transitive mount of the remote file system within a private namespace of the server data processing system for the client, wherein the private namespace is invisible to other clients of the server data processing system; and
   responsive to the flag comprising a multiplex flag, forwarding the protocol packet to the destination file system.

2. The method of claim 1, wherein forwarding the protocol packet to the destination file system comprises forwarding the protocol packet to the destination file system without unmarshalling and remarshalling.

3. The method of claim 1, further comprising:
   responsive to receiving a request from a client to mount the remote file system, returning to the client instructions for connecting to a destination file server for the remote file system such that the client establishes a direction connection to the destination file server using the instructions without involvement of the server data processing system.

4. The method of claim 3, further comprising:
   receiving the instructions for connecting to the destination file server from the destination file server.

5. The method of claim 1, further comprising:
   responsive to the flag comprising the multiplex flag, tracking tags and file system identifiers destined for the remote file system and multiplexing subsequent protocol requests to the remote the system without intermediate processing on the server data processing system.

6. The method of claim 1, further comprising:
   responsive to the flag comprising an advise flag, returning a list of direct connection instructions to the client without establishing a transitive mount of the remote file system.

7. A computer program product comprising a computer readable storage medium having a computer readable program stored therein, wherein the computer readable program, when executed on a server data processing system, causes the server data processing system to:
   responsive to receiving a protocol packet for accessing a destination file system from a client, determine whether the destination file system is a local file system or a remote file system;
   responsive to determining the destination file system is a local file system, process the protocol packet at the server data processing system;
   responsive to determining the destination file system is a remote file system, identify a flag in the protocol packet;
   responsive to the flag comprising a global mount flag, establish a transitive mount of the remote file system within a global namespace of the server data processing system;
   responsive to the flag comprising a session mount flag, establish a transitive mount of the remote file system within a private namespace of the server data processing system for the client, wherein the private namespace is invisible to other clients of the server data processing system; and
   responsive to the flag comprising a multiplex flag, forward the protocol packet to the destination file system.

8. The computer program product of claim 7, wherein forwarding the protocol packet to the destination file system comprises forwarding the protocol packet to destination file system without unmarshalling and remarshalling.

9. The computer program product of claim 7, wherein the computer readable program further causes the server data processing system to:
   responsive to receiving a request from a client to mount the remote file system, return to the client instructions for connecting to a destination file server for the remote file system such that the client establishes a direction connection to the destination file server using the instructions without involvement of the server data processing system.

10. The computer program product of claim 9, wherein the computer readable program further causes the server data processing system to:
    receive the instructions for connecting to the destination file server from the destination file saver.

11. The computer program product of claim 7, wherein the computer readable program is stored in a computer readable storage medium in a data processing system and wherein the computer readable program was downloaded over a network from a remote data processing system.

12. The computer program product of claim 7, wherein the computer readable program is stored in a computer readable storage medium in a server data processing system and wherein the computer readable program is downloaded over a network to a remote data processing system for use in a computer readable storage medium with the remote system.

13. The computer program product of claim 7, wherein the computer readable program further causes the server data processing system to:
    responsive to the flag comprising the multiplex flag, track tags and file system identifiers destined for the remote file system and multiplex subsequent protocol requests to the remote file system without intermediate processing on the server data processing system.

14. The computer program product of claim 7, wherein the computer readable program further causes the server data processing system to:
responsive to the flag comprising an advise flag, return a list of direct connection instructions to the client without establishing a transitive mount of the remote file system.

15. A server data processing system, comprising:
a processor; and
a memory coupled to the processor, wherein the memory comprises instructions which, when executed by the processor, cause the processor to:
responsive to receiving a protocol packet for accessing a destination file system from a client, determine whether the destination file system is a local file system or a remote file system;
responsive to determining the destination file system is a local file system, process the protocol packet at the server data processing system;
responsive to determining the destination file system is a remote the system, identify a flag in the protocol packet;
responsive to the flag comprising a global mount flag, establish a transitive mount of the remote file system within a global namespace of the server data processing system;
responsive to the flag comprising a session mount flag, establish a transitive mount of the remote file system within a private namespace of the server data processing system for the client, wherein the private namespace is invisible to other clients of the server data processing system; and
responsive to the flag comprising a multiplex flag, forward the protocol packet to the destination file system.

16. The server data processing system of claim 15, wherein forwarding the protocol packet to the destination file system comprises forwarding the protocol packet to the destination file system without unmarshalling and remarshalling.

17. The server data processing system of claim 15, wherein the instructions further cause the processor to:
responsive to receiving a request from a client to mount the remote file system, return to the client instructions for connecting to a destination file server for the remote file system such that the client establishes a direction connection to the destination file server using the instructions without involvement of the server data processing system.

18. The server data processing system of claim 17, wherein the instructions further cause the processor to:
receive the instructions for connecting to the destination file server from the destination file server.

19. The server data processing system of claim 15, wherein the instructions further cause the processor to:
responsive to the flag comprising the multiplex flag, track tags and file system identifiers destined for the remote file system and multiplex subsequent protocol requests to the remote file system without intermediate processing on the server data processing system.

20. The server data processing system of claim 15, wherein the instructions further cause the processor to:
responsive to the flag comprising an advise flag, return a list of direct connection instructions to the client without establishing a transitive mount of the remote file system.

* * * * *